United States Patent [19]
Ahlstone

[11] 3,768,842
[45] Oct. 30, 1973

[54] LIGHT WEIGHT MARINE RISER PIPE

[75] Inventor: Arthur G. Ahlstone, Ventura, Calif.

[73] Assignee: Vetco Offshore Industires, Inc., Ventura, Calif.

[22] Filed: Aug. 5, 1971

[21] Appl. No.: 169,199

[52] U.S. Cl. ............... 285/55, 138/141, 138/DIG. 9, 166/.6, 285/174, 285/239, 285/321, 285/423
[51] Int. Cl. .......................... F16l 9/14, F16l 39/00
[58] Field of Search ...................... 285/55, 239, 235, 285/423, 114, 321, 119, 238, 174; 138/177, 178, DIG. 2, DIG. 9, 109, 140, 141, 149; 166/.6

[56] References Cited
UNITED STATES PATENTS

| | | | |
|---|---|---|---|
| 2,809,699 | 10/1957 | Battle | 285/238 |
| 2,854,030 | 9/1958 | Schulthess | 285/239 |
| 3,501,173 | 3/1970 | Petersen et al. | 285/114 |
| 3,565,119 | 2/1971 | Pierpont | 138/177 X |
| 3,119,415 | 1/1964 | Galloway et al. | 138/149 X |
| 3,548,884 | 12/1970 | Ambrose | 138/DIG. 9 |
| 3,194,274 | 7/1965 | Griffiths et al. | 138/140 X |
| 3,130,753 | 4/1964 | Monnen | 138/DIG. 9 |
| 3,604,461 | 9/1971 | Matthews | 138/141 X |
| 3,080,893 | 3/1963 | Craycraft | 138/141 |
| 3,151,633 | 10/1964 | Shuman | 138/177 |
| 2,857,931 | 10/1958 | Lawton | 285/55 |
| 3,455,578 | 7/1969 | Hanes | 285/321 X |

*Primary Examiner*—Thomas F. Callaghan
*Attorney*—Bernard Kriegel

[57] ABSTRACT

A marine riser pipe system for use in drilling underwater well bores comprising pipe joints coupled to one another by steel connector members, each pipe joint being a wound structure of fiberglass filaments coated with an epoxy or other suitable resin, which sets to bond the filaments in place, the filament wound structure being secured to the steel connector members, thereby providing a light weight pipe joint, and corresponding light weight marine riser pipe string when the connector members of adjacent joints are secured together, the weight of the filament wound marine riser pipe being about one-third the weight of an equivalent steel riser pipe having substantially the same strength. To protect the filament wound pipe, it can be provided with an abrasion resistant inner liner and an encapsulating outer shell to protect it from damage. To further lighten the riser pipe and to make it buoyant in sea water, sleeves of buoyant material may be attached to the exterior of the filament wound pipe, the encapsulating outer shell then being disposed around and secured to the buoyant sleeves, providing an integral pipe joint structure.

2 Claims, 11 Drawing Figures

United States Patent
Ahlstone
[11] 3,768,842
[45] Oct. 30, 1973
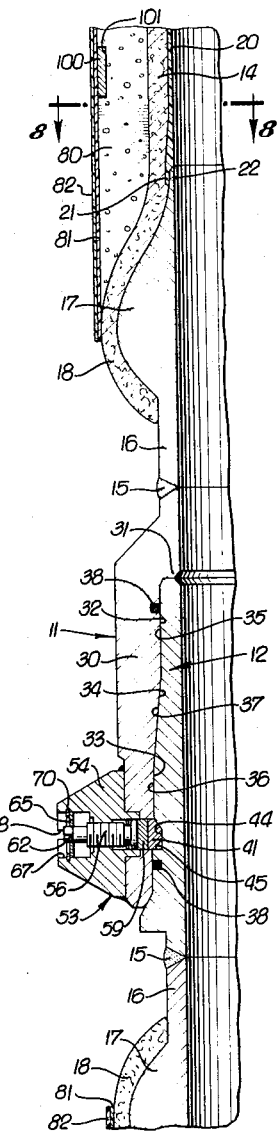

Patented Oct. 30, 1973

INVENTOR.
ARTHUR G. AHLSTONE
BY
Bernard Kriegel
ATTORNEY.

Patented Oct. 30, 1973

INVENTOR.
ARTHUR G. AHLSTONE
BY
Bernard Kriegel
ATTORNEY.

Patented Oct. 30, 1973

INVENTOR.
ARTHUR G. AHLSTONE
BY Bernard Kriegel
ATTORNEY.

LIGHT WEIGHT MARINE RISER PIPE

The present invention relates to pipe strings, and more particularly to vertical marine riser pipe strings used in drilling underwater well bores.

In offshore drilling of well bores from a floating vessel, a steel marine riser pipe system has been used, extending from an underwater blowout preventer stack at the ocean bottom back to the rig on the floating vessel. A tensioning system on the floating ring supports and tensions the marine riser system. In deeper water, the weight of the marine riser pipe is correspondingly greater, requiring a much stronger tensioning system. Tensioning systems present many problems of high maintenance and down-time when worked at or near their capacity, because of the comparatively large weight of pipe they must support. In addition, the relatively great weight of the steel pipe sections makes them difficult to handle on the floating ring.

In accordance with the present invention, marine riser joints are used which are lighter in weight than steel joints. As an example, the weight in water of the marine riser joint will be about one-third of an equivalent all-steel marine riser joint. The main mass of the marine riser joint is a filament wound reinforced plastic, such as filament wound glass fibers coated with a suitable resin, this joint including metallic end connectors, such as steel connectors, appropriately secured to the filament wound section. The thickness of the filament wound joint is such as to substantially equal a corresponding steel joint in strength. Accordingly, a marine riser joint is provided that is much lighter in weight than a steel one, facilitating handling of the joint on the floating rig. In addition, the external diameter of the pipe joint is much less than steel joints that have buoyant modules mounted on their exterior, facilitating storage of the joints on the floating rig, as well as providing less frictional drag and less projected area for moving water to act against when the riser joints are submerged in service. The formation of the filament wound joint with metal end connectors makes it possible for the connections to be made in the same manner as all steel joints.

Thus, the marine riser system is provided which will have a low weight in water as compared to steel, and a much lower cost than steel marine riser systems including buoyant modules attached to the pipe joints.

A further objective of the invention is to provide pipe for use in marine riser systems of light weight, the pipe sections each being provided with an internal liner or protective sleeve to absorb the wear and tear of tools and equipment moving through and working inside each riser joint.

A further objective of the invention is to provide a sleeve on the exterior of the light weight joint which will absorb the wear, tear, abrasion and impact to which its exterior will be subjected.

In addition, buoyant material may be secured to the exterior of the filament wound light weight pipe, with the overall diameter of the pipe section being substantially no greater than that of the end connectors or coupling members, thereby providing a marine riser pipe having integral buoyancy, of much lighter weight in air, of smaller cross-sectional area, lower cost, and less frictional drag when in the water than an all-steel marine riser joint that has buoyant modules attached to its exterior.

This invention possesses many other advantages, and has other objects which may be made more clearly apparent from a consideration of several forms in which it may be embodied. Such forms are shown in the drawings accompanying and forming part of the present specification. These forms will now be described in detail for the purpose of illustrating the general principles of the invention; but it is to be understood that such detailed description is not to be taken in a limiting sense.

Referring to the drawings:

FIG. 7 is a view similar to FIG. 6 illustrating another embodiment of the invention;

FIG. 9 is an isometric view of one of the half sleeves of buoyant material incorporated in the marine riser string illustrated in FIG. 7;

FIG. 10 is a cross-section similar to FIG. 8 of another embodiment of the invention;

FIG. 11 is a cross-section similar to FIG. 8 of still a further embodiment of the invention.

Figure 6:
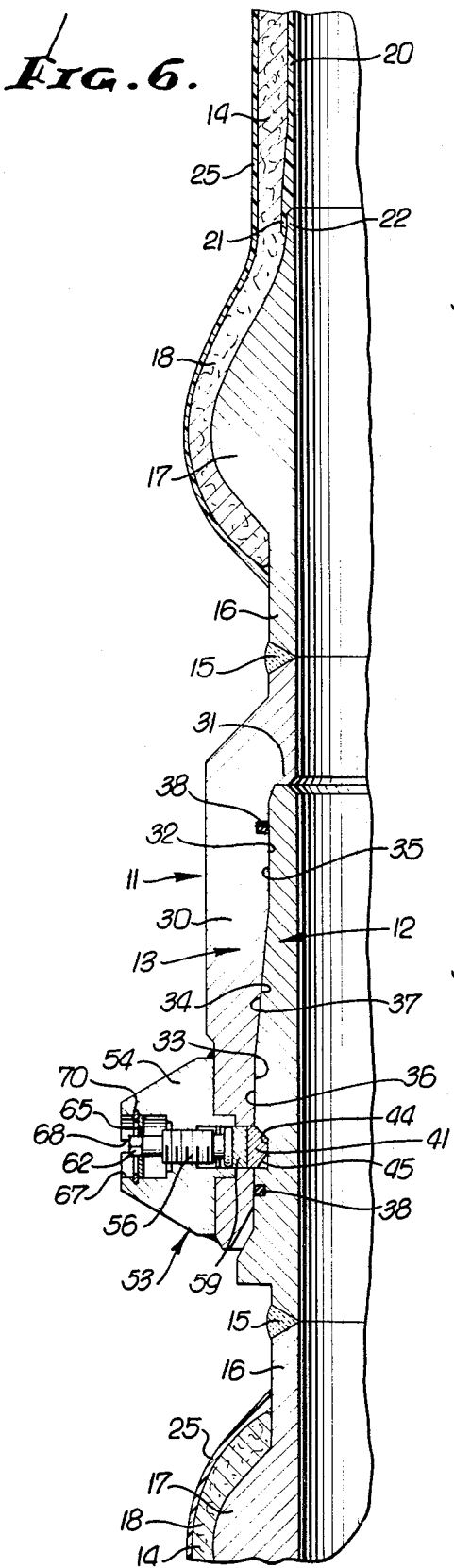
FIG. 6 is a quarter longitudinal section through adjacent end portions of marine riser pipe sections secured to one another.
Figure 2:
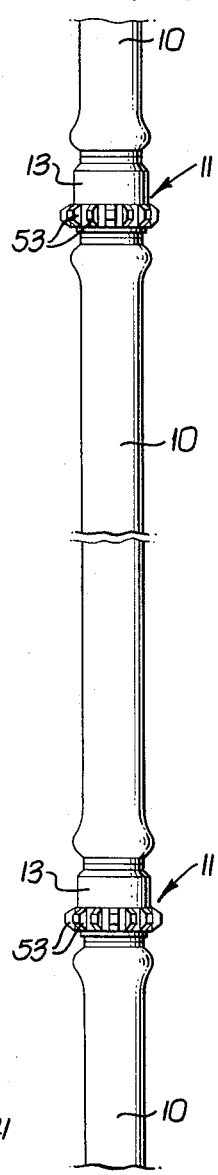
FIG. 2 is a side elevational view of a portion of the marine riser pipe string.
Figure 1:
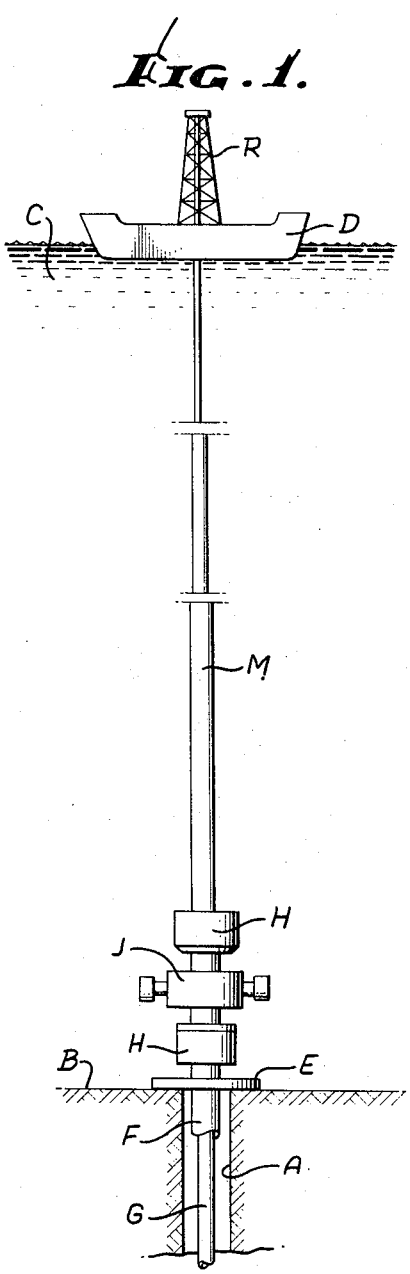
FIG. 1 is a diagrammatic view of an underwater well bore in conjunction with a floating vessel, and a marine riser conductor and associated equipment extending between the well bore and the vessel.
Figure 3:
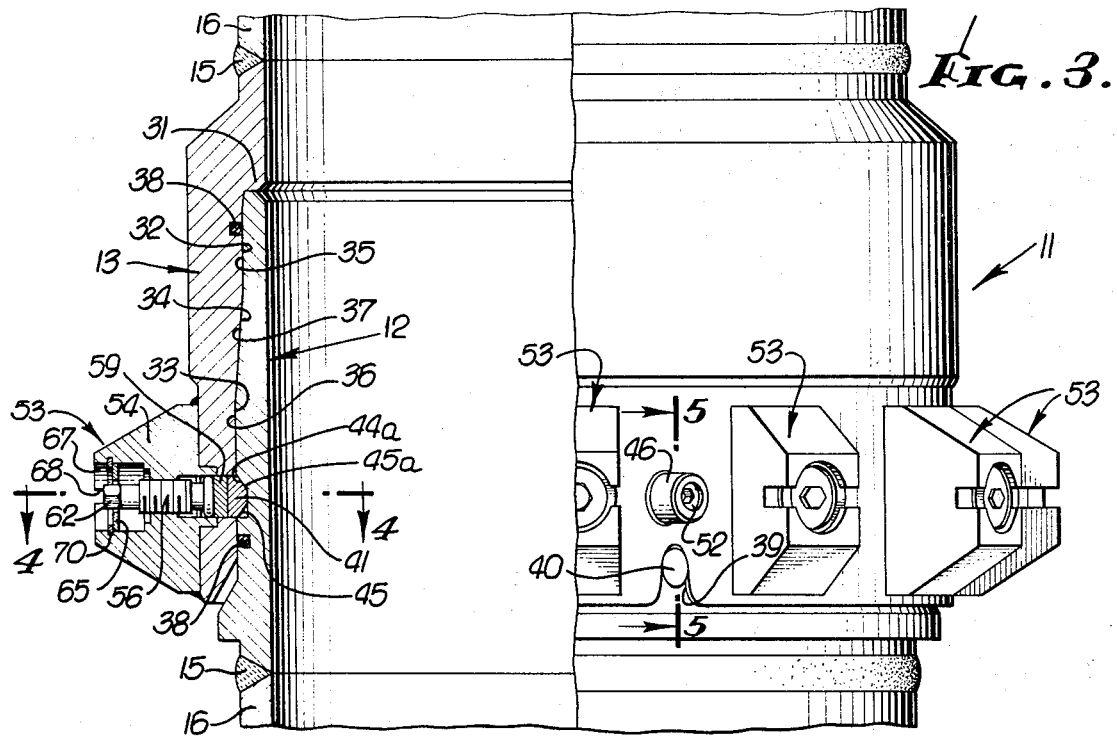
FIG. 3 is an enlarged side elevational view and longitudinal section of a connector for securing sections of marine riser pipe together.
Figure 4:
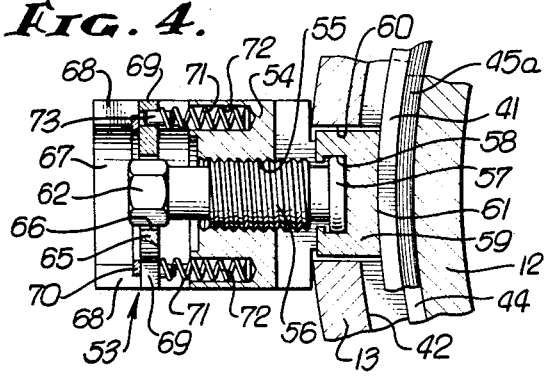
FIG. 4 is an enlarged section taken along the line 4—4 of FIG. 3.
Figure 5:
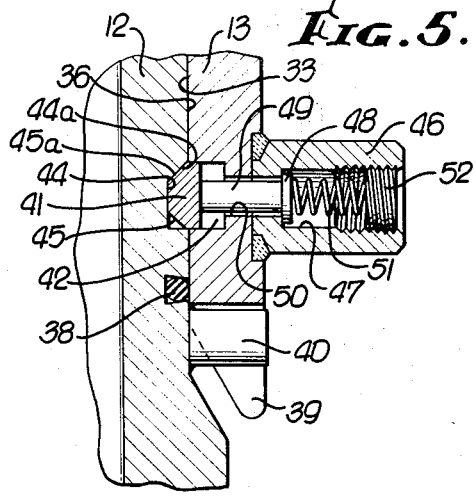
FIG. 5 is an enlarged section taken along the line 5—5 of FIG. 3.

As shown diagrammatically in FIG. 1, an underwater well bore A extends downwardly from the floor B of a body of water C on which a drilling barge or vessel D is floating. A suitable base E rests on the ocean floor, there being a plurality of concentric casing strings F, G. extending downwardly into the well bore and being suitably cemented therein. One of the strings of casing is connected through a connector or connectors H and one or more blowout preventers J to the lower portion of a marine riser conductor pipe M extending upwardly to the drilling barge D on which a drilling rig R is mounted.

The marine riser pipe string is of much lighter weight than a steel pipe string, comprising joints or sections 10 secured together by suitable connectors 11. A typical length of marine riser joint 10 is 40 feet to 50 feet, each joint having a pin 12 at one end and a box 13 at its other end, the box receiving the pin of an adjacent riser joint, the pin and box being suitably connected together. The particular pin and box connector 11 illustrated in the drawings is specifically described and claimed in the application of Carl F. Huntsinger et al., Ser. No. 855,535, filed Sept. 5, 1969, for "Pipe Connectors", now U.S. Pat. No. 3,606,393, being described somewhat in detail hereinbelow.

Each pipe joint 10 includes a filament wound inner pipe 14 connected at one end to a steel connector pin 12 and at its other end to a steel connector box 13. The pin and box are each suitably secured, as by welding material 15, to a pup joint 16 having an enlargement or a convex hump 17 about which an enlarged end portion 18 of the filament wound pipe 14 is to be disposed, as described hereinbelow, for the purpose of integrating the filament wound pipe 14 to the steel adapters or pup joints 16. The pipe section 14 itself comprises fiberglass filaments coated with a suitable binder, such as an epoxy or polyester resin, with the end portions 18 wound around the enlargement or hump 17. The filaments are fiberglass, wound in helical fashion and of a suitable number of layers, to build up a sufficient wall thickness of the pipe to provide the required strength in the pipe joint approaching or exceeding the strength of an equivalent steel pipe joint. The specific manner of winding the coated filaments forms no part of the present invention, being described in U.S. Pat. No. 3,537,484. In general, the pin and box end connectors 12,16 and 13,16 of a single joint 10 are mounted on the end portions of a special mandrel (not shown), an abrasion resistant liner or sleeve 20 being disposed on the mandrel between the two end connectors, the end portions 21 of the abrasion resistant liner, which may be of urethane, or a thin-wall tube of steel, being piloted over the end portions 22 of the pup joints 16, the sleeve 20 being suitably sealed to such end portions, the liner or sleeve 20 itself having an inside diameter corresponding to the inside diameter of the pup joints 16.

The mandrel with the riser connectors and the inner sleeve 20 positioned thereon is then mounted on a filament wrapping machine, whereupon the glass fiber filaments, with an epoxy or polyester resin coating thereon, are wrapped over the convex humps 17 of the connector pup joints 16 and over the inner sleeve 20, the wrapping continuing until the desired thickness of pipe 14 is achieved, with the enlarged portion 18 at each end of the filament wound pipe, which is internally concave, fitting around its companion convex hump 17 on the steel adapter or pup joint. When the thermosetting resin is cured, a functionally integral, rigid structure has been produced between the metallic end connectors 12, 16, 13, 16, the intervening filament wound pipe 14, and the inner abrasion resistant liner 20, the urethane liner or metal sleeve 20 itself being bonded to the filament wound glass fibers.

After the resin has cured, an abrasion resistant sleeve 25 can be installed on the outside of the filament wound joint of pipe 14. This sleeve may be made of urethane and be suitably affixed, as by use of an epoxy adhesive, to the exterior of the filament wound pipe 14.

A composite marine riser joint 10, as above described, will have a weight of about one-third of an equivalent all-steel marine riser joint in water, greatly reducing the weight that must be supported by a tensioning system (not shown) on the floating rig R. In addition, its light weight makes it easier to handle on the rig itself.

The specific connector for securing the steel pin portion 12 of one light weight joint to the box portion 13 of an adjacent light weight joint includes a box member 13 on one joint adapted to telescopically fit upon a pin member 12 of an adjacent joint. The box member comprises an elongate skirt portion 30 having an internally downwardly facing shoulder 31, an upper cylindrical inner wall 32, a lower cylindrical inner wall 33, and an intermediate conical or tapered inner wall 34. The pin member 12 is adapted to abut the shoulder 31 at its upper end and has an upper cylindrical outer wall 35, a lower cylindrical outer wall 36, which fit within the cylindrical walls 32, 33 of the box member, respectively, and also a tapered intermediate external wall 37 adapted to fit within the tapered wall 34 of the box member. Suitable seals are provided comprising O-ring type seals 38 interposed between the cylindrical walls of the box member and the pin member.

Locating means may be provided for determining the relative orientation of the box member and the pin member. Accordingly, the skirt portion 30 of the box member has a downwardly opening slot or notch 39 receiving an outwardly extended locator pin 40 secured to the pin member when the box and pin members are in predetermined relative angular relation.

In order to lock the box and pin members 13, 12 together against axial separation, a split resilient lock ring 41 is carried in an internal annular box groove 42 which extends circumferentially within the cylindrical wall of the skirt portion. This lock ring is adapted to also be disposed in an external pin groove 44 extending circumferentially around the cylindrical wall of the pin member 12. The lock ring 41 is adapted to extend outwardly fully into the groove 42 in the box member, or to be caused to contract into the groove 44 in the pin member. When the box member 13 is moved axially or telescopically onto the pin member 12, the lock ring 41 is expanded upon its engagement with the upper end of the pin member. Thus, the lock ring has bevelled surfaces 45 adapted to effect a camming action to secure such expansion of the lock ring when engaged by the pin member 12.

Since the diameter of the base of the groove 42 in the box member is greater than the contracted diameter of the lock ring, to allow for outward expansion of the lock ring as it moves downwardly over the pin member and onto the cylindrical wall 36 of the latter, the lock member is held yieldably centered in the groove by centralizer means provided at regularly spaced locations about the box member. The centralizer means includes a tubular body 46 having a bore 47 in which is reciprocably disposed the enlarged head 48 of a pin 49, the pin extending through an opening 50 in the box member with the inner end of the pin engaging the outer periphery of the lock ring 41. A coil compression spring 51 is disposed in the bore of the body in engagement with the head 48 and a plug 52 is threaded into the body to provide a spring seat. With such a centralizer construction located at circumferentially spaced positions about the box member, the ring 41 will be normally centralized, but capable of expansion and contraction to enable the connector 11 to be assembled and disassembled.

To actuate the lock ring 41 and effect its contraction into locking position in the groove 44 of the pin member, a plurality of actuator devices 53 are circumferentially spaced about the box member. A typical actuator device comprises a boss or body 54 welded to the box member 13, the body including a threaded bore 55 in which is disposed a threaded actuator screw 56 having an annular enlargement or flange 57 at its inner end rotatably disposed in a slot 58 in an actuator pad 59. This actuator pad is disposed in a radial opening 60 in the box member and has an inner face 61 curved to conform generally to the outer periphery of the lock ring 41. At its outer end, the actuator screw has a non-circular or hexagonal head 62 adapted to be engaged by a driving tool or wrench (not shown) so that the pad 59 may be shifted inwardly to deform or contract the lock ring 41 into locking engagement in the groove 44 of the pin member, or the pad 59 may be shifted outwardly to allow expansion of the lock ring during connection of the bod member to or removal or connection of the box member from the pin member.

Under some circumstances, vibration may tend to cause the actuator screw 56 to back off, thereby enabling undesired expansion of the lock ring 41 and disconnection of the connector. To avoid this undesirable result, each actuator device 53 includes a lock plate 65 reciprocable with respect to the actuator screw 56 and having a hexagonal opening 66 conforming to and adapted to receive the head 62 of the actuator screw when the lock plate is in its normal position. The actuator body 54 has an outer bore 67 and a pair of opposed radial slots 68 receiving ears 69 of the lock plate, to permit axial but non-rotative movement of the plate 65 in the actuator body. A split retainer ring 70 is disposed in the bore to limit outward movement of the lock plate to a location at which the actuator screw head 62 is disposed in the complemental opening 66 of the lock plate. A pair of compression springs 71 disposed in bores 72 in the body are centered by pins 73 carried by the ears of the lock plate and engage such ears to normally bias the lock plate to the position in which rotation of the actuator screw 56 is prevented. However, the application of a wrench to the screw head 62 will cause the wrench to effect inward displacement of the lock plate to a location at which the plate 65 is disposed about a reduced diameter circular portion 74 of the actuator screw, so that the actuator screw is permitted to be rotated by the wrench in either direction. When the wrench is removed from the screw head, the lock plate 65 will be automatically biased by the springs 71 to a screw locking position.

In the use of the connector when the box member 13 is to be applied to the pin member 12, the actuator screws 56 are rotated and backed out to retract the pads 59 into the slots 60 in the actuator bodies, at which location the lock ring 41 is free for maximum required expansion as the box member 13 moves axially over the exterior of the pin member 12. When the box member is fully seated upon the pin member, with the grooves 42, 44 in opposed relation, the actuator screws 56 are moved inwardly in any desired sequence to deform the lock ring inwardly into fully locking engagement in the groove 44. Conversely, if the connector 11 is to be disconnected, the actuator screws are backed off until the lock ring is free to expand circumferentially fully into the groove 42 in the box member. At this time, an axial pull on a pipe joint 10 and its box member 13 will cause the lock ring 41 to be cammed outwardly by the coengagement between the bevelled wall 44a of the groove and the tapered surface 45a of the lock ring.

Although a particular connector has been illustrated and described to illustrate a preferred form of connector to be used in securing pipe joints 10 to one another, it is to be understood that any suitable type of connector can be used, since the specific connector per se forms no part of the present invention.

Figure 8:
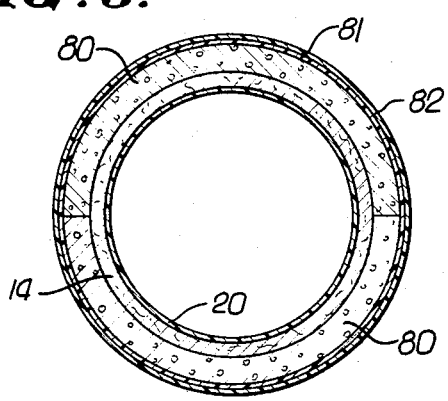
FIG. 8 is a cross-section, on a reduced scale, taken along the line 8—8 on FIG. 7.

Some applications of marine riser joints will require them to be buoyant in water. To accomplish this objective, half sleeves 80 (FIGS. 7 to 9) of buoyant material are attached to the filament wound pipe 14 while the resin coating the filaments are still in a wet condition. If required, the opposed sleeve halves may be held together on the pipe 14 by straps 100 fitting in peripheral grooves 101. The sleeves or buoyant material can extend along the entire length of the filament wound pipe joint from one enlarged portion 18 of the filament wound pipe to the other, and may be applied in the absence of the outer shell or protective sleeve 25. The buoyant material of which the sleeves are made can be a syntactic foam in which hollow silica or phenolic microspheres are embedded. Several additional wraps or layers 81 of fiberglass filaments coated with the plastic resin are placed over the exterior of the buoyant sleeves 80, these extra wraps encapsulating and protecting the buoyant material from damage and making the buoyant material an integral part of the riser joint. As disclosed (FIG. 7), the overall diameter of the pipe joint will approximate the diameter of the enlarged end portions 18 of the filament wound pipe, the additional wraps 81 of glass fiber filaments or plastic resin being substantially tangent to the maximum diameter of the filament wound pipe enlarged end portions.

The glass fiber marine riser pipe M, with the buoyant sleeves 80 secured thereto, will be much lighter in air, have a smaller cross-sectional area, a lower cost, and less frictional drag when in water than a corresponding all-steel marine riser pipe, to the exterior of which buoyant material 80 may be secured. In addition, if desired, an outer skin 82 of urethane may be adhered to the filament wound external layers 81 to provide an abrasion resistant skin protecting the fiberglass pipe during handling. This outer layer or sleeve 82 will also protect the riser joints 20 against moving waters when in service.

The sleeves 80 of buoyant material mounted on the exterior of the filament wound pipe 14 can be provided with different configurations. As disclosed in FIGS. 7, 8 and 9, the sleeves 80 may be circular in cross-section, with a corresponding protective wrapping or sleeve 81 therearound. In FIG. 10, sleeves 80a of substantially square outer cross-section are provided within a square protective sleeve 81a, with choke and kill lines 83 mounted on the exterior of the sleeve 81a and suitably secured thereto.

As disclosed in FIG. 11, the filament wound pipe 14 may have buoyant sleeves 80b of elliptical shape secured thereto, these sleeves being encapsulated within an elliptical protective shell 81b and, if desired, also having choke and kill lines 83 extending therethrough between the filament wound pipe and the protective shell. The elliptical configuration provides a desirable streamlining and is less subject to the action of underwater currents.

I claim:

1. A marine riser pipe string for drilling underwater well bores; comprising pipe joints, each joint including an elongate filament wound rigid pipe portion of such wall thickness as to be at least substantially equal in strength to an equivalent steel pipe portion having the same internal diameter and length, a metallic connector secured to each end of said filament wound pipe portion, the internal diameter of said connector and pipe portion being substantially equal, the metallic connectors of adjacent pipe joints being coupled to each other to provide a marine riser pipe string of light weight; the filaments of said pipe portion comprising fiberglass set in a thermosetting resin, each of said metallic connectors including an external enlarged portion having an external convex shape over which the filaments of said pipe portion are wound to secure said filament wound pipe portion to said connector, and an abrasion resistant liner within said filament wound pipe portion secured to and extending from and between the connectors secured to the ends of said pipe portion, the internal diameter of said liner being substantially equal to the internal diameter of said connectors, and a sleeve buoyant in water mounted on said filament wound pipe portion and extending along the major portion of the length of said pipe portion, said sleeve comprising hollow microspheres embedded in a syntactic foam.

2. A marine riser pipe as defined in claim 1, and an outer shell on said sleeve extending from and between the connectors secured to the ends of said pipe portion.

* * * * *